US012462038B2

(12) United States Patent
Ozugur

(10) Patent No.: US 12,462,038 B2
(45) Date of Patent: Nov. 4, 2025

(54) SYSTEM AND METHOD FOR SECURITY THREAT IDENTIFICATION AND RESOLUTION

(71) Applicant: Bank of America Corporation, Charlotte, NC (US)

(72) Inventor: Timucin Ozugur, Fairview, TX (US)

(73) Assignee: Bank of America Corporation, Charlotte, NC (US)

( * ) Notice: Subject to any disclaimer, the term of this patent is extended or adjusted under 35 U.S.C. 154(b) by 357 days.

(21) Appl. No.: 18/163,188

(22) Filed: Feb. 1, 2023

(65) Prior Publication Data

US 2024/0256675 A1 Aug. 1, 2024

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC ............ G06F 21/577; G06F 2221/033; G06F 21/552; G06F 30/27; G06F 11/3692; G06F 11/368; G06F 8/40; G06F 8/71; G06F 11/3688; G06F 40/194
See application file for complete search history.

(56) References Cited

U.S. PATENT DOCUMENTS 8,887,286 B2 11/2014 Dupont et al.
9,208,057 B2 12/2015 Valdiviezo Basauri et al.
9,213,850 B2 12/2015 Barton et al.
9,286,471 B2 3/2016 Qureshi et al.
9,535,818 B2 1/2017 Vasudevan et al.
9,591,010 B1 3/2017 Muddu et al.
9,716,721 B2 7/2017 Hovor et al.
10,055,338 B2 8/2018 Gyure et al.
10,261,781 B2 4/2019 Balasubramanian et al.
10,341,374 B1 * 7/2019 Sadaghiani ........... G06F 18/217
10,762,206 B2 9/2020 Titonis et al.
10,838,849 B2 * 11/2020 Kochura ............... G06F 40/279
11,140,061 B1 * 10/2021 Sanders .............. H04L 41/0893
11,593,485 B1 * 2/2023 Briliauskas ........... G06F 21/566
2017/0063894 A1 3/2017 Muddu et al.
2017/0124487 A1 5/2017 Szeto et al.
2019/0114167 A1 4/2019 Biddle et al.
2020/0137110 A1 4/2020 Tyler et al.
2021/0014256 A1 1/2021 Malhotra
2021/0192057 A1 6/2021 Helfman et al.
2022/0108020 A1 4/2022 Dang et al.

* cited by examiner

*Primary Examiner* — Jeffrey C Pwu

(57) ABSTRACT

A method for security threat identification using artificial intelligence/machine learning is provided. The method includes receiving code changes for a new version of an application code. New potential threats are determined for the new version of the application code based on the code changes and pre-trained code changes. A new potential threat score is determined based on the new potential threats and a current potential threat score of a current version of the application code. New pre-determined threats are determined for the new version of the application code based on a self-service threat model of the new version of the application code. A new pre-determined threat score is determined based on the new pre-determined threats and a current pre-determined threat score of the current version of the application code. A threat confidence level is determined based on the new potential threat score and the new pre-determined threat score.

20 Claims, 3 Drawing Sheets

SYSTEM AND METHOD FOR SECURITY THREAT IDENTIFICATION AND RESOLUTION

TECHNICAL FIELD

The present disclosure relates generally to security threat identification, and more specifically to a system and method for security threat identification and resolution.

BACKGROUND

Threat modeling of applications is a time-consuming activity, which may need many hours of software engineers, software architects, and information security teams to create threat models, identify threats, and plan to remediate the threats. Therefore, threat modeling is not very scalable in large organizations with thousands of applications if threat modeling is performed for each and every application whenever there is a code change. Generally, threat modeling is performed by information security teams for business-critical applications and/or applications with public internet access whenever there is a code change. Other applications may complete threat modeling themselves as a self-service, which is generally not performed for every version of the applications. This creates a gap in a security posture of the organization when there are many applications that are expected to perform a self-service threat modeling with less frequency and without much guidance.

SUMMARY

The system described in the present disclosure provides several practical applications and technical advantages that overcome the current technical problems with threat modeling of a plurality of applications that are maintained by a computing system of an organization. The following disclosure facilitates identifying security threats for an application (e.g., a non-business-critical application and/or an application with no public internet access) for which threat modeling is not performed for each and every version of the application. In particular, a threat identification system is configured to identify threats and a threat confidence level for each and every version of the application without performing a resource-intensive threat modeling and review by a security team. Furthermore, the threat identification system is configured to identify a version of the application for which a threat confidence level is below a threat confidence level threshold and notify the security team that threat modeling and review is needed for the identified version of the application. By identifying threats and a threat confidence level for each and every version of the application and notifying the security team of only those versions of the application for which threat modeling and review are actually required, the security of the application may be maintained and/or improved. This, in turn, improves the network security of the entire computing system of the organization. Furthermore, by performing threat modeling and review for only a selected subset of versions of the application that are identified by the threat identification system, computing resources (e.g., computing time, memory, and/or network bandwidth) that would otherwise be consumed by the security team for performing threat modeling and review on each and every application version is reduced. Accordingly, the following disclosure is particularly integrated into practical application of: (1) maintaining and/or improving network security of a computing system of an organization; and (2) reducing computing resources (e.g., computing time, memory, and/or network bandwidth) that are needed to maintain and/or improve network security of a computing system of an organization.

The system disclosed in the present application provides a technical solution to the technical problems discussed above by providing a threat identification system that is configured to receive code changes of a new version of an application code and identifying threats caused by the code changes. The threat identification system may implement an intelligence/machine learning (AI/ML) module that may be trained using applications (e.g., business-critical applications and/or applications with public internet access) for which threat modeling is performed for each version of the applications. In particular, the AI/ML module correlates pre-trained code changes with respective threats. The AI/ML module receives code changes of a new version of an application (e.g., non-business-critical applications and/or application with no public internet access) for which threat modelling is not performed and compares the received code changes to the pre-trained code changes. In response to a code change matching a respective pre-trained code change, the AI/ML module identifies one or more threats corresponding to the respective pre-trained code change, and respective threat levels. Subsequently, the AI/ML module determines a threat confidence level based on the identified threats and sends to the security team a notification that a threat model creation and review are needed before deploying the new version of the application code.

In one embodiment, an apparatus includes a memory and a processor communicatively coupled to the memory. The memory is configured to store a plurality of pre-trained code changes, a plurality of threats associated to the plurality of pre-trained code changes, a plurality of weights associated to the plurality of threats, a release number threshold, and a threat confidence threshold. The processor is configured to receive a plurality of code changes for a new version of an application code, determine a plurality of new potential threats for the new version of the application code based on the plurality of code changes and the plurality of pre-trained code changes, determine a new potential threat score based on the plurality of new potential threats of the new version of the application code and a current potential threat score of a current version of the application code, determine a plurality of new pre-determined threats for the new version of the application code based on a self-service threat model of the new version of the application code, determine a new pre-determined threat score based on the plurality of new pre-determined threats of the new version of the application code and a current pre-determined threat score of the current version of the application code, determine a threat confidence level based on the new potential threat score and the new pre-determined threat score, determine a number of releases since a latest threat model creation and review, compare the number of releases to the release number threshold, in response to the number of releases being greater than or equal to the release number threshold, compare the threat confidence level to the threat confidence threshold, and in response to the threat confidence level being less than the threat confidence threshold, send a notification that a threat model creation and review are needed before deploying the new version of the application code.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

Figure 1:
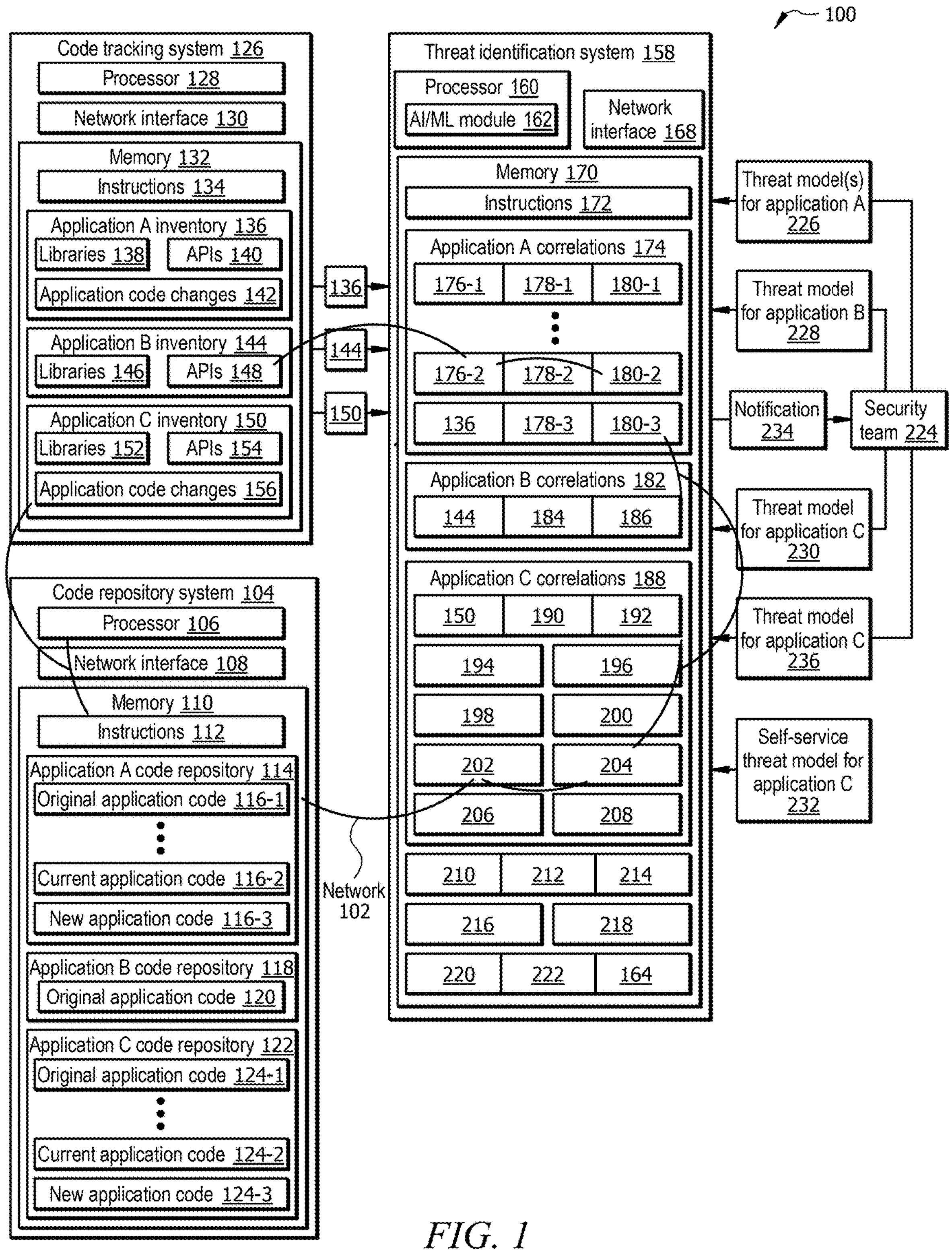
FIG. 1 illustrates an embodiment of a system configured to identify security threats for applications.
Figure 2A:
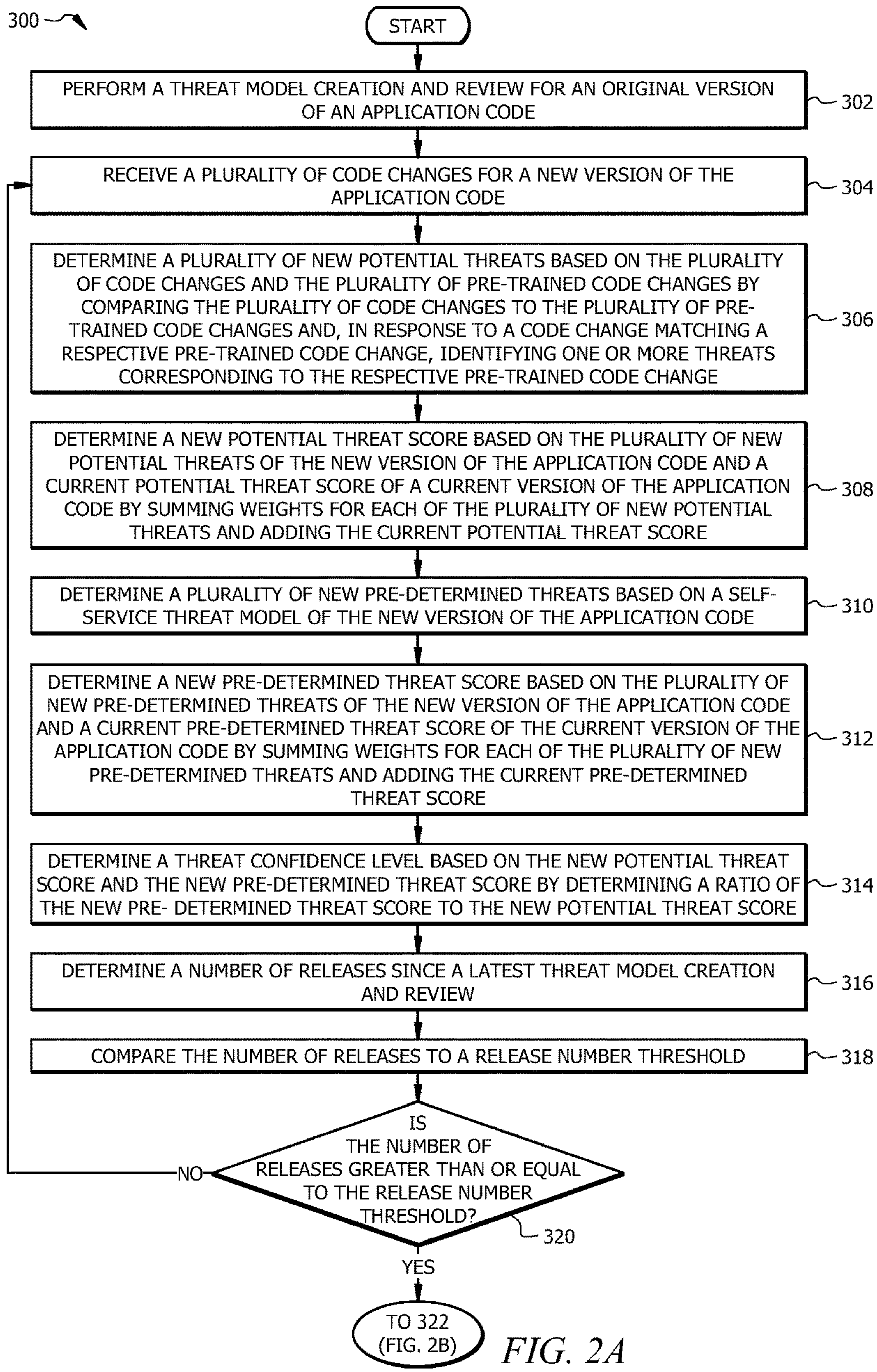
FIGS. 2A and 2B illustrate an example operational flow of system of FIG. 1 for identifying security threats for applications.
Figure 2B:
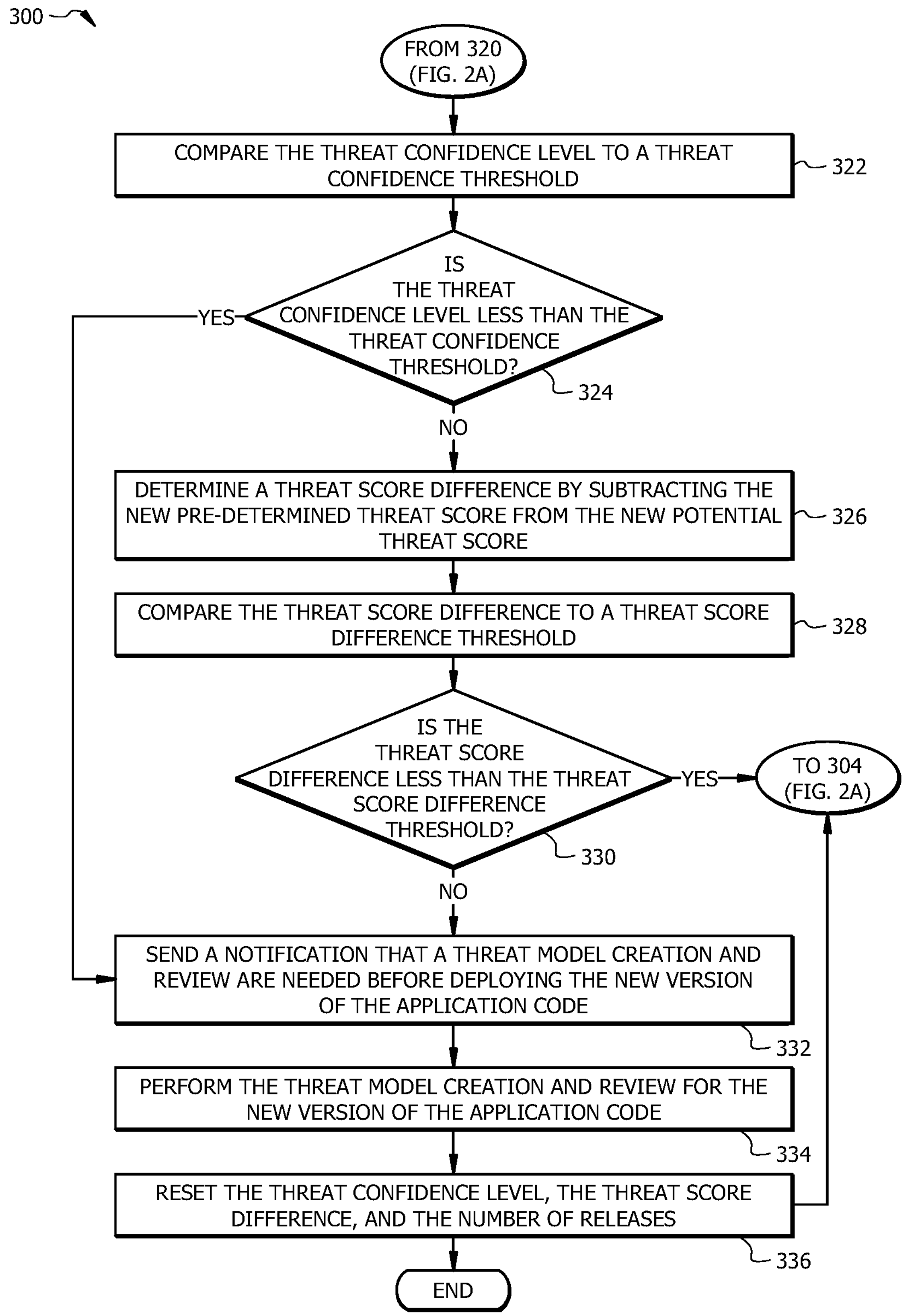

As described above, previous technologies fail to provide scalable solution for security threat identification for non-business-critical applications and/or for applications with no public internet access. Embodiments of the present disclosure and their advantages may be understood by referring to FIGS. 1, 2A and 2B. FIGS. 1, 2A and 2B are used to describe a system and method for identifying security threats for applications.

System Overview

FIG. 1 illustrates an embodiment of a system 100 that is generally configured to identify security threats for various applications. In certain embodiments, the system 100 comprises a code tracking system 126 operably coupled to a code repository system 104 and a threat identification system 158 via a network 102. Network 102 enables the communication between the components of the system 100. The threat identification system 158 is configured to identify security threats for different versions of applications without performing threat modeling. In other embodiments, system 100 may not have all the components listed and/or may have other elements instead of, or in addition to, those listed above.

System Components

Network

Network 102 may be any suitable type of wireless and/or wired network. The network 102 may or may not be connected to the Internet or public network. The network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth™ network, a near field communication (NFC) network, and/or any other suitable network. The network 102 may be configured to support any suitable type of communication protocol as would be appreciated by one of ordinary skill in the art.

Code Repository System

The code repository system 104 is generally any device that is configured to process and store data and communicate with other components of the system 100 via the network 102. The code repository system 104 may comprise a processor 106 in signal communication with a memory 110 and a network interface 108.

Processor 106 comprises one or more processors operably coupled to the memory 110. The processor 106 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 106 may be a programmable logic device, a microcontroller, a microprocessor, or any suitable combination of the preceding. The one or more processors are configured to process data and may be implemented in hardware or software. For example, the processor 106 may be 8-bit, 16-bit, 32-bit, 64-bit, or of any other suitable architecture. The one or more processors are configured to implement various software instructions to perform the operations described herein. For example, the one or more processors are configured to execute software instructions 112 and perform one or more functions described herein.

Network interface 108 is configured to enable wired and/or wireless communications (e.g., via network 102). The network interface 108 is configured to communicate data between the code repository system 104 and other components of the system 100. For example, the network interface 108 may comprise a WIFI interface, a local area network (LAN) interface, a wide area network (WAN) interface, a modem, a switch, or a router. The processor 106 is configured to send and receive data using the network interface 108. The network interface 108 may be configured to use any suitable type of communication protocol as would be appreciated by one of ordinary skill in the art.

Memory 110 may be volatile or non-volatile and may comprise a read-only memory (ROM), random-access memory (RAM), ternary content-addressable memory (TCAM), dynamic random-access memory (DRAM), and static random-access memory (SRAM). Memory 110 may be implemented using one or more disks, tape drives, solid-state drives, and/or the like. The memory 110 may store any of the information described in FIGS. 1, 2A and 2B along with any other data, instructions, logic, rules, or code operable to implement the function(s) described herein when executed by the processor 106. The memory 110 is operable to store software instructions 112, and/or any other data and instructions. The software instructions 112 may comprise any suitable set of software instructions, logic, rules, or code operable to be executed by the processor 106.

The memory 110 may further store repositories for various applications, with each repository storing various versions of a respective application. In certain embodiments, the memory 110 stores a code repository 114 for application A, a code repository 118 for application B, and a code repository 122 for application C. The application A may be a business-critical application or an application with public internet access. The application B may be a business-critical application, a non-business-critical application, an application with public internet access, or an application without public internet access. The application C may be a non-business-critical application or an application without public internet access. The code repository 114 for application A stores an original version of the application A code (e.g., original application code 116-1), a current version of the application A code (e.g., current application code 116-2), all intermediate versions of the application A code, and a new version of the application A code (e.g., new application code 116-3).

In certain embodiments, the application B is a new-deployed application. In such embodiment, the code repository 118 for application B stores an original version of the application B code (e.g., original application code 120).

The code repository 122 for application C stores an original version of the application C code (e.g., original application code 124-1), a current version of the application C code (e.g., current application code 124-2), all intermediate versions of the application C code, and a new version of the application C code (e.g., new application code 124-3).

Code Tracking System

The code tracking system 126 is generally any device that is configured to process data and communicate with other components of the system 100 via the network 102. The code tracking system 126 may comprise a processor 128 in signal communication with a memory 132 and a network interface 130.

Processor 128 comprises one or more processors operably coupled to the memory 132. The processor 128 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 128 may be a programmable logic device, a microcontroller, a microprocessor, or any suitable combination of the preceding. The one or more processors are configured to process data and may be implemented in hardware or software. For example, the processor 128 may be 8-bit, 16-bit, 32-bit, 64-bit, or of any other suitable architecture. The one or more processors are configured to implement various software instructions to perform the operations described herein. For example, the one or more processors are configured to execute software instructions 134 and perform one or more functions described herein.

Network interface 130 is configured to enable wired and/or wireless communications (e.g., via network 102). The network interface 130 is configured to communicate data between the code tracking system 126 and other components of the system 100. For example, the network interface 130 may comprise a WIFI interface, a local area network (LAN) interface, a wide area network (WAN) interface, a modem, a switch, or a router. The processor 128 is configured to send and receive data using the network interface 130. The network interface 130 may be configured to use any suitable type of communication protocol as would be appreciated by one of ordinary skill in the art.

Memory 132 may be volatile or non-volatile and may comprise a read-only memory (ROM), random-access memory (RAM), ternary content-addressable memory (TCAM), dynamic random-access memory (DRAM), and static random-access memory (SRAM). Memory 132 may be implemented using one or more disks, tape drives, solid-state drives, and/or the like. The memory 132 may store any of the information described in FIGS. 1, 2A and 2B along with any other data, instructions, logic, rules, or code operable to implement the function(s) described herein when executed by the processor 128. The memory 132 is operable to store software instructions 134, and/or any other data and instructions. The software instructions 134 may comprise any suitable set of software instructions, logic, rules, or code operable to be executed by the processor 128.

In certain embodiments, the code tracking system 136 is configured to track code changes for various applications stored in the code repository system 104 to build inventory of each application code. For example, the memory 132 stores an application A inventory 136, an application B inventory 144, and an application C inventory 150. The application A inventory 136 may include libraries 138 and application programming interfaces (APIs) 140 for the application A, and application code changes 142 between the current application code 116-2 and the new application code 116-3. The application B inventory 144 may include libraries 146 and APIs 148 for the application B. The application C inventory 150 may include libraries 152 and APIs 154 for the application C, and application code changes 156 between the current application code 124-2 and the new application code 124-3.

Threat Identification System

The threat identification system 158 is generally any device that is configured to process data and communicate with other components of the system 100 via the network 102. The threat identification system 158 may comprise a processor 160 in signal communication with a memory 170 and a network interface 168.

Processor 160 comprises one or more processors operably coupled to the memory 170. The processor 160 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 160 may be a programmable logic device, a microcontroller, a microprocessor, or any suitable combination of the preceding. The one or more processors are configured to process data and may be implemented in hardware or software. For example, the processor 160 may be 8-bit, 16-bit, 32-bit, 64-bit, or of any other suitable architecture. The one or more processors are configured to implement various software instructions to perform the operations described herein. In one embodiment, the one or more processors are configured to execute software instructions 172 to implement an artificial intelligence/machine learning (AI/ML) module 162 and perform one or more functions described herein. In this way, the processor 160 may be a special-purpose computer designed to implement the functions disclosed herein.

Network interface 168 is configured to enable wired and/or wireless communications (e.g., via network 102). The network interface 168 is configured to communicate data between the threat identification system 158 and other components of the system 100. For example, the network interface 168 may comprise a WIFI interface, a local area network (LAN) interface, a wide area network (WAN) interface, a modem, a switch, or a router. The processor 160 is configured to send and receive data using the network interface 168. The network interface 168 may be configured to use any suitable type of communication protocol as would be appreciated by one of ordinary skill in the art.

Memory 170 may be volatile or non-volatile and may comprise a read-only memory (ROM), random-access memory (RAM), ternary content-addressable memory (TCAM), dynamic random-access memory (DRAM), and static random-access memory (SRAM). Memory 170 may be implemented using one or more disks, tape drives, solid-state drives, and/or the like. The memory 170 may store any of the information described in FIGS. 1, 2A and 2B along with any other data, instructions, logic, rules, or code operable to implement the function(s) described herein. The memory 170 is operable to store software instructions 172, and/or any other data and instructions. The software instructions 172 may comprise any suitable set of software instructions, logic, rules, or code operable to be executed by the processor 160.

As described below in greater detail, the threat identification system 158 is configured to identify security threats for an application (e.g., a non-business-critical application and/or an application with no public internet access) for which threat modeling is not performed for each and every version of the application. In particular, the threat identification system 158 may be configured to identify threats and a threat confidence level for each and every version of the application without performing threat modeling and review by a security team 224. Furthermore, the threat identification system may be configured to identify a version of the application for which a threat confidence level is below a threat confidence level threshold and notify the security team 224 that threat modeling and review is needed for the identified version of the application.

The threat identification system 158 is configured to receive an application inventory for each application and identify threats based on the application inventory. For example, the threat identification system 158 is configured to receive application A inventories for each version of the application A and identify threats based on the application A inventories. In certain embodiments when the application A is a business-critical application or an application with public internet access, a security team 224 performs threat modeling for each version of the application A code and sends a respective threat model (e.g., threat model 226) to the threat identification system 158. Each threat model may identify respective threats and respective threat levels. The A/ML module 162 is configured to determine correlations 174 for application A, which include correlations between application inventories and respective threats. For example, the correlations 174 for application A include the application A inventory 176-1 for the original version of the application A, respective threats 178-1, and respective threat levels 180-1. The correlations 174 for application A further include the application A inventory 176-2 for the current version of the application A, respective threats 178-2, and respective threat levels 180-2, and the application A inventory 136 for the new version of the application A, respective threats 178-3, and respective threat levels 180-3. The threat levels 180-1, 180-2, and 180-3 may be "Critical," "High," "Medium," or "Low." In certain embodiments, weights 222 may be assigned to respective threat levels. For example, a weight of 4 is assigned to the "Critical" threat level, a weight of 3 is assigned to the "High" threat level, a weight of 2 is assigned to the "Medium" threat level, and a weight of 1 is assigned to the "Low" threat level.

The security team 224 may perform threat modeling for each newly deployed application. In certain embodiments when the application B is a newly deployed application, the security team 224 performs threat modeling and sends a threat model 228 to the threat identification system 158, with the threat model 228 identifying threats 184 and respective threat levels 186. In such embodiments, the correlations 182 for application B include the application B inventory 144 for the original version of the application B, respective threats 184, and respective threat levels 186. The threat levels 186 may be "Critical," "High," "Medium," or "Low."

In certain embodiments, the AI/ML module 162 may be trained by using the correlations 174 for application A and the correlations 182 for application B as training data to correlate various code changes (also referred to as pre-trained code changes) to respective threats and respective threat levels. In such embodiments, the memory 170 may store pre-trained code changes 210 with corresponding threats 212 and threat levels 214. The threat levels 214 may be "Critical," "High," "Medium," or "Low." As described below in greater detail, the AI/ML module 162 may use these correlations to identify threats for applications for which threat modeling is not performed by the security team 224 and determine when threat modeling may be needed.

In certain embodiments when the application C is a non-business-critical application or an application without public internet access, the security team 224 may perform threat modeling for the originally deployed version of the application C, and may not perform any further threat modeling for subsequent versions of the application C. In certain embodiments, a developer of the application C may provide a self-service threat model (e.g., self-service threat model 232) for one or more subsequent versions of the application C. Each self-service threat model may identify threats and respective threat levels, which may be also referred to as pre-determined threats and pre-determined threat levels, respectively.

For each subsequent version of the application C, the AI/ML module 162 may determine correlations 188 for application C. For example, the AI/ML module 162 may determine two sets of threats and respective threat levels. In certain embodiments when the self-service threat model (e.g., self-service threat model 232) has been received by the threat identification system 158, the AI/ML module 162 identifies new pre-determined threats (e.g., threats 194) and respective threat levels (e.g., threat levels 196) based on the self-service threat model. The threat identification system 158 may also receive an application C inventory (e.g., application C inventory 150) and identify new potential threats (e.g., threats 190) and respective threat levels (e.g., threat levels 192) based on the application C inventory. For example, the AI/ML module 162 compares a plurality of code changes (e.g., application code changes 156) from the application C inventory to the plurality of pre-trained code changes 210. In response to a code change matching a respective pre-trained code change, the AI/ML module 162 identifies one or more threats (e.g., threats 212) corresponding to the respective pre-trained code change, and respective threat levels (e.g., threat levels 214).

In certain embodiments, the AI/ML module 162 determines a new potential threat score (e.g., new potential threat score 202) based on the new potential threats (e.g., threats 190) of the new version of the application C code (e.g., new application code 124-3) and a current potential threat score (e.g., current potential threat score 198) of a current version of the application code (e.g., current application code 124-2). The new potential threat score may be determined by summing weights (e.g., weights 222) for each new potential threat (e.g., threats 190) and adding the current potential threat score (e.g., current potential threat score 198).

In certain embodiments, the AI/ML module 162 further determines a new pre-determined threat score (e.g., new pre-determined threat score 204) based on the new pre-determined threats (e.g., threats 194) identified in the self-service threat model created using the new version of the application C code (e.g., new application code 124-3) and a current pre-determined threat score (e.g., current pre-determined threat score 200) of the current version of the application code (e.g., current application code 124-2). The new pre-determined threat score may be determined by summing weights (e.g., weights 222) for each new pre-determined threat (e.g., threats 194) and adding the current pre-determined threat score (e.g., current pre-determined threat score 200).

The AI/ML module 162 further determines a number of new code releases (e.g., number of releases 164) for application C since the latest thread modeling performed by the security team 224. The AI/ML module 162 then compares the number of new code releases to a release number threshold (e.g., release number threshold 220). In response to determining that the number of new code releases is less than the release number threshold, the AI/ML module 162 determines that threat modeling is not needed and receives code changes for a subsequent version of the application C.

In response to determining that the number of new code releases is greater than or equal to the release number threshold, the AI/ML module 162 determines a threat confidence level (e.g., threat confidence level 206) by determining a ratio of the new pre-determined threat score (e.g., new pre-determined threat score 204) to the new potential threat score (e.g., new potential threat score 202). Subsequently, the AI/ML module 162 compares the threat confidence level (e.g., threat confidence level 206) to a threat confidence threshold (e.g., threat confidence level threshold 216).

In response to the threat confidence level (e.g., threat confidence level 206) being less than the threat confidence threshold (e.g., threat confidence level threshold 216), the AI/ML module 162 sends a notification (e.g., notification 234) to the security team 224 that a threat model creation and review are needed before deploying the new version of the application code (e.g., new application code 124-3).

In response to the threat confidence level (e.g., threat confidence level 206) being greater than or equal to the threat confidence threshold (e.g., threat confidence level threshold 216), the AI/ML module 162 determine a threat score difference (e.g., threat score difference 208) by subtracting the new pre-determined threat score (e.g., new pre-determined threat score 204) from the new potential threat score (e.g., new potential threat score 202). Subsequently, the AI/ML module 162 compares the threat score difference (e.g., threat score difference 208) to a threat score difference threshold (e.g., threat score difference threshold 218).

In response to the threat score difference (e.g., threat score difference 208) being less than the threat score difference threshold (e.g., threat score difference threshold 218), the AI/ML module 162 determines that threat modeling is not needed and receives code changes for a subsequent version of the application C.

In response to the threat score difference (e.g., threat score difference 208) being greater than or equal to the threat score difference threshold (e.g., threat score difference threshold 218), the AI/ML module 162 sends a notification (e.g., notification 234) to the security team 224 that a threat model creation and review are needed before deploying the new version of the application code (e.g., new application code 124-3).

Artificial Intelligence/Machine Learning Module

AI/ML module 162 may be implemented by the processor 160 executing the software instructions 172 and is configured to identify security threats for various applications. In certain embodiments, the AI/ML module 162 may be configured to perform operations of method 300 (see FIGS. 2A and 2B) as described below in greater detail.

In certain embodiments, the AI/ML module 162 may be implemented by a support vector machine, neural network, random forest, k-means clustering, etc. In certain embodiments, the AI/ML module 162 may be implemented by a plurality of neural network layers, convolutional neural network layers, Long-Short-Term-Memory (LSTM) layers, Bi-directional LSTM layers, recurrent neural network layers, and the like. In certain embodiments, the AI/ML module 162 may be implemented by a text processing, natural language processing, and the like. In certain embodiments, the AI/ML module 162 may be implemented by unsupervised, semi-supervised, and/or supervised machine learning techniques. In certain embodiments, the AI/ML module 162 may be implemented using a k-nearest neighbors (KNN) algorithm, a decision-tree algorithm, or a regression algorithm.

Example Method for Identifying Security Threats of an Application

FIGS. 2A and 2B illustrate an example flowchart of a method 300 for identifying security threats of an application. Modifications, additions, or omissions may be made to method 300. Method 300 may include more, fewer, or other operations. For example, operations may be performed in parallel or in any suitable order. For example, one or more operations of method 300 may be implemented, at least in part, in the form of the software instructions (e.g., instructions 112, 134, and/or 172 of FIG. 1), stored on non-transitory, tangible, machine-readable medium (e.g., memories 110, 132, and/or 170 of FIG. 1) that when executed by one or more processors (e.g., processors 106, 128, and/or 160 of FIG. 1) implements an AI/ML module (e.g., AI/ML module 162 of FIG. 1) and may cause the one or more processors to perform operations 302-336.

At operation 302, a security team (e.g., security team 224 of FIG. 1) performs a threat model (e.g., threat model 230 of FIG. 1) creation and review for an original version of an application code (e.g., original application code 124-1 of FIG. 1).

At operation 304, a threat identification system (e.g., threat identification system 158 of FIG. 1) receives a plurality of code changes (e.g., code changes 156 of FIG. 1) for a new version of the application code (e.g., new application code 124-3 of FIG. 1).

At operation 306, the threat identification system determines a plurality of new potential threats (e.g., new potential threats 190 of FIG. 1) based on the plurality of code changes and the plurality of pre-trained code changes (e.g., pre-trained code changes 210 of FIG. 1) by comparing the plurality of code changes to the plurality of pre-trained code changes and, in response to a code change matching a respective pre-trained code change, identifying one or more threats (e.g., threats 212 of FIG. 1) corresponding to the respective pre-trained code change.

At operation 308, the threat identification system determines a new potential threat score (e.g., new potential threat score 202 of FIG. 1) based on the plurality of new potential threats of the new version of the application code and a current potential threat score (e.g., current potential threat score 198 of FIG. 1) of a current version of the application code (e.g., current application code 124-2 of FIG. 1) by summing weights (e.g., weight 222 of FIG. 1) for each of the plurality of new potential threats and adding the current potential threat score.

At operation 310, the threat identification system determines a plurality of new pre-determined threats (e.g., new pre-determined threats 194 of FIG. 1) based on a self-service threat model (e.g., self-service threat model 232 of FIG. 1) of the new version of the application code.

At operation 312, the threat identification system determines a new pre-determined threat score (e.g., new pre-determined threat score 204 of FIG. 1) based on the plurality of new pre-determined threats of the new version of the application code and a current pre-determined threat score (e.g., current pre-determined threat score 200 of FIG. 1) of the current version of the application code by summing weights (e.g., weights 222 of FIG. 1) for each of the plurality of new pre-determined threats and adding the current pre-determined threat score.

At operation 314, the threat identification system determines a threat confidence level (e.g., threat confidence level 206 of FIG. 1) based on the new potential threat score and the new pre-determined threat score by determining a ratio of the new pre-determined threat score to the new potential threat score.

At operation 316, the threat identification system determines a number of releases (e.g., number of releases 164 of FIG. 1) since a latest threat model creation and review by the security team 224.

At operation 318, the threat identification system compares the number of releases to a release number threshold (e.g., release number threshold 220 of FIG. 1).

At operation 320, the threat identification system determines if the number of releases is greater than or equal to the release number threshold. In response to the number of releases not being greater than or equal to the release number threshold, method 300 continues to operation 304. In response to the number of releases being greater than or equal to the release number threshold, method 300 continues to operation 322.

At operation 322, the threat identification system compares the threat confidence level to a threat confidence threshold (e.g., threat confidence threshold 216 of FIG. 1).

At operation 324, the threat identification system determines if the threat confidence level is less than the threat confidence threshold. In response to in response to the threat confidence level being less than the threat confidence threshold, method 300 continues to operation 332. In response to in response to the threat confidence level not being less than the threat confidence threshold, method 300 continues to operation 326.

At operation 326, the threat identification system determines a threat score difference (e.g., threat score difference 208 of FIG. 1) by subtracting the new pre-determined threat score from the new potential threat score.

At operation 328, the threat identification system compares the threat score difference to a threat score difference threshold (e.g., threat score difference threshold 218 of FIG. 1).

At operation 330, the threat identification system determines if the threat score difference is less than the threat score difference threshold. In response to the threat score difference being less than the threat score difference threshold, method 300 continues to operation 304. In response to the threat score difference not being less than the threat score difference threshold, method 300 continues to operation 332.

At operation 332, the threat identification system sends to the security team a notification (e.g., notification 234 of FIG. 1) that a threat model (e.g., threat model 236 of FIG. 1) creation and review are needed before deploying the new version of the application code.

At operation 334, the security team performs the threat model creation and review for the new version of the application code.

At operation 336, the threat identification system resets the threat confidence level, the threat score difference, and the number of releases. In certain embodiments, method 300 may continue to operation 304 if a subsequent version of the application is received.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus comprising:

a memory configured to store:
- a plurality of pre-trained code changes;
- a plurality of threats associated to the plurality of pre-trained code changes;
- a plurality of weights associated to the plurality of threats;
- a release number threshold; and
- a threat confidence threshold; and a processor communicatively coupled to the memory, wherein the processor is configured to:
- receive application inventory for each of a plurality of versions of an application code, wherein the plurality of versions of the application code include an original version of the application code, a current version of the application code, and a new version of the application code and wherein the application inventory includes a code change between the current version of the application code and the new version of the application code;
- determine a plurality of correlations for the application code based at least on the received application inventories associated with each version of the plurality of versions of the application code, wherein the correlations include an inventory for an original version of the application code and a threat level associated with the original version of the application code;
- receive a plurality of code changes associated with the new version of the application code;
- determine a plurality of new potential threats for the new version of the application code based at least on the plurality of code changes and the plurality of pre-trained code changes, wherein the plurality of pre-trained code changes includes the plurality of correlations for the application code;
- determine a new potential threat score based on the plurality of new potential threats of the new version of the application code and a current potential threat score of a current version of the application code;

determine a plurality of new pre-determined threats for the new version of the application code based on a self-service threat model of the new version of the application code;

determine a new pre-determined threat score based on the plurality of new pre-determined threats of the new version of the application code and a current pre-determined threat score of the current version of the application code;

determine a threat confidence level based on the new potential threat score and the new pre-determined threat score;

determine a number of releases since a latest threat model creation and review;

compare the number of releases to the release number threshold;

in response to the number of releases being greater than or equal to the release number threshold, compare the threat confidence level to the threat confidence threshold; and in response to the threat confidence level being less than the threat confidence threshold, send a notification that a threat model creation and review are needed before deploying the new version of the application code.

2. The apparatus of claim 1, wherein:

the memory is further configured to store:

a threat score difference threshold; and the processor is further configured to:

in response to the threat confidence level being greater than or equal to the threat confidence threshold:

determine a threat score difference by subtracting the new pre-determined threat score from the new potential threat score;

compare the threat score difference to the threat score difference threshold; and in response to the threat score difference being greater than or equal to the threat score difference threshold, send a notification that the threat model creation and review are needed before deploying the new version of the application code.

3. The apparatus of claim 2, wherein the processor is further configured to:

in response to the threat score difference being less than the threat score difference threshold:

receive a plurality of code changes for a next version of the application.

4. The apparatus of claim 1, wherein determining the plurality of new potential threats based on the plurality of code changes comprises:

comparing the plurality of code changes to the plurality of pre-trained code changes; and in response to a code change matching a respective pre-trained code change, identifying one or more threats corresponding to the respective pre-trained code change.

5. The apparatus of claim 1, wherein determining the threat confidence level based on the new potential threat score and the new pre-determined threat score comprises:

determining a ratio of the new pre-determined threat score to the new potential threat score.

6. The apparatus of claim 1, wherein determining the new potential threat score comprises:

summing weights for each of the plurality of new potential threats and adding the current potential threat score.

7. The apparatus of claim 1, wherein determining the new pre-determined threat score comprises:

summing weights for each of the plurality of new pre-determined threats and adding the current pre-determined threat score.

8. A method comprising:

receiving application inventory for each of a plurality of versions of an application code, wherein the plurality of versions of the application code include an original version of the application code, a current version of the application code, and a new version of the application code and wherein the application inventory includes a code change between the current version of the application code and the new version of the application code;

determining a plurality of correlations for the application code based at least on the received application inventories associated with each version of the plurality of versions of the application code, wherein the correlations include an inventory for an original version of the application code and a threat level associated with the original version of the application code;

receiving a plurality of code changes associated with the new version of the application code;

determining a plurality of new potential threats for the new version of the application code based at least on the plurality of code changes and the plurality of pre-trained code changes, wherein the plurality of pre-trained code changes includes the plurality of correlations for the application code;

determining a new potential threat score based on the plurality of new potential threats of the new version of the application code and a current potential threat score of a current version of the application code;

determining a plurality of new pre-determined threats for the new version of the application code based on a self-service threat model of the new version of the application code;

determining a new pre-determined threat score based on the plurality of new pre-determined threats of the new version of the application code and a current pre-determined threat score of the current version of the application code;

determining a threat confidence level based on the new potential threat score and the new pre-determined threat score;

determining a number of releases since a latest threat model creation and review;

comparing the number of releases to a release number threshold;

in response to the number of releases being greater than or equal to the release number threshold, comparing the threat confidence level to a threat confidence threshold; and in response to the threat confidence level being less than the threat confidence threshold, sending a notification that a threat model creation and review are needed before deploying the new version of the application code.

9. The method of claim 8, further comprising:

in response to the threat confidence level being greater than or equal to the threat confidence threshold:

determining a threat score difference by subtracting the new pre-determined threat score from the new potential threat score;

comparing the threat score difference to a threat score difference threshold; and in response to the threat score difference being greater than or equal to the threat score difference threshold, sending a notification that the threat model creation and review are needed before deploying the new version of the application code.

10. The method of claim 9, further comprising:

in response to the threat score difference being less than the threat score difference threshold:

receiving a plurality of code changes for a next version of the application.

11. The method of claim 8, wherein determining the plurality of new potential threats based on the plurality of code changes comprises:

comparing the plurality of code changes to the plurality of pre-trained code changes; and in response to a code change matching a respective pre-trained code change, identifying one or more threats corresponding to the respective pre-trained code change.

12. The method of claim 8, wherein determining the threat confidence level based on the new potential threat score and the new pre-determined threat score comprises:

determining a ratio of the new pre-determined threat score to the new potential threat score.

13. The method of claim 8, wherein determining the new potential threat score comprises:

summing weights for each of the plurality of new potential threats and adding the current potential threat score.

14. The method of claim 8, wherein determining the new pre-determined threat score comprises:

summing weights for each of the plurality of new pre-determined threats and adding the current pre-determined threat score.

15. A non-transitory computer-readable medium storing instructions that, when executed by one or more processors, cause the one or more processors to:

receive application inventory for each of a plurality of versions of an application code, wherein the plurality of versions of the application code include an original version of the application code, a current version of the application code, and a new version of the application code and wherein the application inventory includes a code change between the current version of the application code and the new version of the application code;

determine a plurality of correlations for the application code based at least on the received application inventories associated with each version of the plurality of versions of the application code, wherein the correlations include an inventory for an original version of the application code and a threat level associated with the original version of the application code;

receive a plurality of code changes associated with the new version of the application code;

determine a plurality of new potential threats for the new version of the application code based at least on the plurality of code changes and the plurality of pre-trained code changes, wherein the plurality of pre-trained code changes includes the plurality of correlations for the application code;

determine a new potential threat score based on the plurality of new potential threats of the new version of the application code and a current potential threat score of a current version of the application code;

determine a plurality of new pre-determined threats for the new version of the application code based on a self-service threat model of the new version of the application code;

determine a new pre-determined threat score based on the plurality of new pre-determined threats of the new version of the application code and a current pre-determined threat score of the current version of the application code;

determine a threat confidence level based on the new potential threat score and the new pre-determined threat score;

determine a number of releases since a latest threat model creation and review;

compare the number of releases to a release number threshold;

in response to the number of releases being greater than or equal to the release number threshold, compare the threat confidence level to a threat confidence threshold; and in response to the threat confidence level being less than the threat confidence threshold, send a notification that a threat model creation and review are needed before deploying the new version of the application code.

16. The non-transitory computer-readable medium of claim 15, wherein the instructions, when executed by the one or more processors, further cause the one or more processors to:

in response to the threat confidence level being greater than or equal to the threat confidence threshold:

determine a threat score difference by subtracting the new pre-determined threat score from the new potential threat score;

compare the threat score difference to a threat score difference threshold; and in response to the threat score difference being greater than or equal to the threat score difference threshold, send a notification that the threat model creation and review are needed before deploying the new version of the application code.

17. The non-transitory computer-readable medium of claim 15, wherein determining the plurality of new potential threats based on the plurality of code changes comprises:

comparing the plurality of code changes to the plurality of pre-trained code changes; and in response to a code change matching a respective pre-trained code change, identifying one or more threats corresponding to the respective pre-trained code change.

18. The non-transitory computer-readable medium of claim 15, wherein determining the threat confidence level based on the new potential threat score and the new pre-determined threat score comprises:

determining a ratio of the new pre-determined threat score to the new potential threat score.

19. The non-transitory computer-readable medium of claim 15, wherein determining the new potential threat score comprises:

summing weights for each of the plurality of new potential threats and adding the current potential threat score.

20. The non-transitory computer-readable medium of claim 15, wherein determining the new pre-determined threat score comprises:

summing weights for each of the plurality of new pre-determined threats and adding the current pre-determined threat score.

* * * * *